United States Patent
Choi et al.

(10) Patent No.: US 10,845,798 B2
(45) Date of Patent: Nov. 24, 2020

(54) MOBILE ROBOT CONTROL APPARATUS AND METHOD FOR COMPENSATING INPUT DELAY TIME

(71) Applicant: KOREA INSTITUTE OF SCIENCE AND TECHNOLOGY, Seoul (KR)

(72) Inventors: Jongsuk Choi, Seoul (KR); Jinhong Noh, Seoul (KR); Yoonseob Lim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 51 days.

(21) Appl. No.: 16/177,751

(22) Filed: Nov. 1, 2018

(65) Prior Publication Data

US 2019/0361431 A1    Nov. 28, 2019

(30) Foreign Application Priority Data

May 28, 2018    (KR) .................. 10-2018-0060465

(51) Int. Cl.
G05D 1/00    (2006.01)
G05D 1/02    (2020.01)
G06F 3/01    (2006.01)

(52) U.S. Cl.
CPC ......... *G05D 1/0022* (2013.01); *G05D 1/0016* (2013.01); *G05D 1/0055* (2013.01); *G05D 1/0214* (2013.01); *G06F 3/015* (2013.01)

(58) Field of Classification Search
CPC .. G05D 1/0022; G05D 1/0214; G05D 1/0055; G05D 1/0016; G05D 1/0274; G06F 3/015
See application file for complete search history.

(56) References Cited

U.S. PATENT DOCUMENTS

| 2011/0152710 A1 | 6/2011 | Kim et al. | |
| 2017/0095383 A1* | 4/2017 | Li | G01C 21/206 |
| 2018/0125319 A1* | 5/2018 | Szatmary | A47L 9/2805 |

FOREIGN PATENT DOCUMENTS

| JP | H09126807 A | * 9/1995 | ............. B25J 19/02 |
| KR | 10-0696275 B1 | 3/2007 | |

(Continued)

OTHER PUBLICATIONS

English_Translation_JPH09126807A (Year: 1995).*

(Continued)

*Primary Examiner* — Peter D Nolan
*Assistant Examiner* — Ashley L Redhead, Jr.
(74) *Attorney, Agent, or Firm* — Rabin & Berdo, P.C.

(57) ABSTRACT

Embodiments are directed to a mobile robot control apparatus for compensating an input delay time, which includes: a user input receiving unit configured to receive a user input for moving a mobile robot from an input device; a waypoint map estimating unit configured to generate an estimated waypoint map in which a waypoint vector is defined for each grid, based on the received user input; an area target determining unit configured to calculate a movable path along which the mobile robot is movable from a current position, and to determine a moving path of the mobile robot based on the calculated movable path and the waypoint vector of the estimated waypoint map; and a driving unit configured to move the mobile robot along the determined moving path, and its control method.

10 Claims, 7 Drawing Sheets

(56) References Cited

FOREIGN PATENT DOCUMENTS

| KR | 10-2011-0072730 A | 6/2011 |
| KR | 10-2015-0137453 A | 12/2015 |
| KR | 10-1585150 B1 | 1/2016 |
| KR | 10-2017-0143062 A | 12/2017 |

OTHER PUBLICATIONS

Abdullah Akce et al., "A Brain-Machine Interface to Navigate a Mobile Robot in a Planar Workspace: Enabling Humans to Fly Simulated Aircraft With EEG", IEEE Transactions on Neural Systems and Rehabilitation Engineering, Mar. 2013, pp. 306-318, vol. 21, No. 2.

Tom Carlson et al., "Brain-Controlled Wheelchairs: A Robotic Architecture", IEEE Robotics & Automation Magazine, 2013, pp. 65-73.

\* cited by examiner

A(t=6)

MOBILE ROBOT CONTROL APPARATUS AND METHOD FOR COMPENSATING INPUT DELAY TIME

CROSS-REFERENCE TO RELATED APPLICATION

This application claims priority to Korean Patent Application No. 10-2018-0060465, filed on May 28, 2018 and all the benefits accruing therefrom under 35 U.S.C. § 119, the contents of which in its entirety are herein incorporated by reference.

STATEMENT REGARDING SPONSORED RESEARCH

This study is supported by the SW computing industry source technology development project of the Ministry of Science and ICT (Development of a non-invasive BCI integrated brain cognitive computing SW platform technology for controlling real life devices and AR/VR devices, Project No. 1711065284) under the sponsorship of Korea Institute of Science and Technology.

BACKGROUND

1. Field

The present disclosure relates to a mobile robot control apparatus and method, and more particularly, to a mobile robot control apparatus and method for compensating an input delay time.

2. Description of the Related Art

A brain-computer interface (BCI) is an interface that connects a human brain directly to a computer to control the computer through electroencephalography (EEG), and this is a core future technology capable of controlling an external device just by thinking without using muscles. Recently, the brain cognitive computing is a field of research that develops various intelligence information technologies by fusing with ICT based on the understanding of human brain. In particular, the brain-computer interface (BCI) technology analyzes human brain to read intention, emotion and the like of the human, and its necessity is now increasing in many fields.

However, it takes a considerable delay time to analyze the EEG of a user and output the result, and there exists errors. In order to solve these problems, there is needed a path planning device that may operate in spite of a low information amount.

SUMMARY

The present disclosure is directed to providing a way to determine a current moving path of a mobile robot in consideration of commands according to user EEG inputs that are input during a delay time.

The object of the present disclosure is not limited to the above, and other objects not mentioned herein will be clearly understood by those skilled in the art from the following description.

In one aspect of the present disclosure, there is provided a mobile robot control apparatus for compensating an input delay time, comprising: a user input receiving unit configured to receive a user input for moving a mobile robot, namely a movement command, from an input device; a waypoint map estimating unit configured to generate an estimated waypoint map in which a waypoint vector is defined for each grid, based on the received user input; an area target determining unit configured to calculate a movable path to which the mobile robot is movable from a current position, and to determine a moving path of the mobile robot based on the calculated movable path and the waypoint vector of the estimated waypoint map; and a driving unit configured to move the mobile robot to the determined moving path.

In an embodiment, the user input receiving unit may receive the movement command after a predetermined delay time after a user EEG is input to the input device from a user.

In an embodiment, the input device may be a brain-computer interface (BCI).

In an embodiment, when a plurality of time-series user inputs are received, the waypoint map estimating unit may add a waypoint vector of each grid of the estimated waypoint map according to each user input.

In an embodiment, when adding a waypoint vector of each grid of the estimated waypoint map according to each user input, the waypoint map estimating unit may endow a weight to the waypoint vector of the estimated waypoint map according to the time that the movement command is received.

In an embodiment, the waypoint map estimating unit may endow a greater weight as the time that the movement command is received is closer to a current time.

In an embodiment, the movable path may include a linear speed and an angular speed.

In an embodiment, the area target determining unit may calculate an inner product of the calculated movable path and the waypoint vector of the waypoint map, and determine a movable path at which the calculated inner product is greatest as a moving path.

In another aspect of the present disclosure, there is also provided a mobile robot control method for compensating an input delay time, comprising: receiving a movement command for moving a mobile robot from an input device; generating an estimated waypoint map in which a waypoint vector is defined for each grid, based on the received movement command; calculating a movable path to which the mobile robot is movable from a current position, and determining a moving path of the mobile robot based on the calculated movable path and the waypoint vector of the estimated waypoint map; and moving the mobile robot to the determined moving path.

In an embodiment, the movement command may be generated after a predetermined delay time after a user EEG is input to the input device from a user, and the input device may be a brain-computer interface (BCI).

In an embodiment, the generating the estimated waypoint map may include: when a plurality of time-series user inputs are received, generating the waypoint map by adding a waypoint vector of each grid of the estimated waypoint map according to each user input, and when a waypoint vector of each grid of the estimated waypoint map according to each user input is added, a weight may be endowed to the waypoint vector of the estimated waypoint map according to the time that the movement command is received.

In an embodiment, the determining the moving path may include: calculating an inner product of the calculated movable path and the waypoint vector of the waypoint map, and determining a movable path at which the calculated inner product is greatest as a moving path.

In another aspect of the present disclosure, there is also provided a computer-readable recording medium, in which commands for executing the above method are stored.

According to an embodiment of the present disclosure, since a waypoint map generated before a delay time is used, it is possible to determine a moving path more suitable for the intention of a user and the current position of a mobile robot.

The effects of the present disclosure are not limited to the above, and other effects not mentioned herein will be clearly understood by those skilled in the art from the appended claims.

DETAILED DESCRIPTION

The embodiments described in this specification may be wholly hardware, partially hardware and partially software, or entirely software. In this specification, the terms such as "unit", "module", "device", "system" or the like refer to computer-related entities such as hardware, a combination of hardware and software, or software. For example, in this specification, the "unit", "module", "device", "system" or the like may be processes in execution, processors, objects, executables, a thread of executions, programs, and/or computers, without being limited. For example, both computers and applications running on the computer may correspond to the "unit", "module", "device", "system" or the like of this specification.

The embodiments are described with reference to the flowchart shown in the figure. For simplicity of explanation, the method is illustrated and described as a series of blocks, but the present disclosure is not limited to the order of the blocks, and some blocks may be executed in different orders and simultaneously, different from the description or illustration of the specification, and various other branches, flow paths and block sequences may be implemented to achieve the same or similar result. In addition, all illustrated blocks may not be required for implementing the method described in the specification. Further, the method according to an embodiment of the present disclosure may be implemented in the form of a computer program for performing a series of processes, and the computer program may be stored on a computer-readable recording medium.

Figure 1:
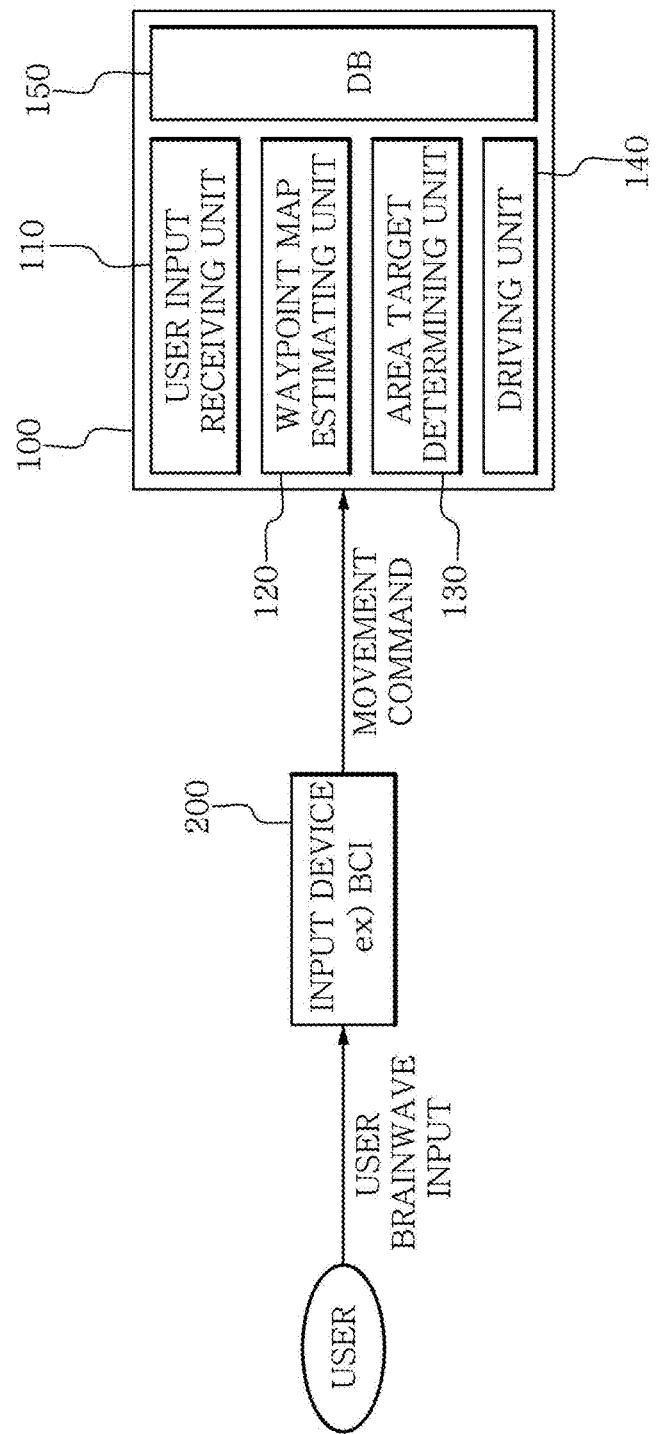
FIG. 1 is a block diagram showing a mobile robot control apparatus for compensating an input delay time according to an embodiment of the present disclosure.

FIG. 1 is a block diagram showing a mobile robot control apparatus for compensating an input delay time according to an embodiment of the present disclosure. Referring to FIG. 1, a user inputs a user EEG to an input device 200, the input device 200 analyzes the input user EEG to generate a movement command and transmits the movement command to a mobile robot control apparatus 100 for compensating an input delay time.

The mobile robot control apparatus 100 for compensating an input delay time may drive the mobile robot according to the received movement command. The input device 200 may be a brain-computer interface (BCI), but is not limited thereto. To this end, an EEG sensor or the like for EEG measurement may be worn on the head of the user.

For example, if the user thinks "moving to the right", the input device 200 may analyze the user EEG to extract the movement command "moving to the right" and transmit the command (as an user input) to the mobile robot control apparatus 100 for a compensating an input delay time. However, the current BCI takes a delay time of about 6 seconds to analyze the EEG of the user and generate a movement command. Thus, the movement command actually intended by the user may not be suitable for a current robot position or movement state. In FIG. 1, if the user EEG is input to the input device at t=1, the movement command corresponding to this user EEG may be transmitted to the apparatus 100 at t=7. Thus, during t=2 to 6, the mobile robot moves according to a previous command, so there may be an error between the actual movement and the movement command according to the user EEG.

The present disclosure proposes a control apparatus and method that minimizes an error caused by a delay time between the EEG input of a user and the movement command that is an output of the input device 200.

Referring to FIG. 1, the user input receiving unit 110 of the mobile robot control apparatus 100 for compensating an input delay time may receive a movement command from the input device 200. The movement command is a result of the input device 200, obtained by analyzing the EEG input of the user.

Also, the movement command received by the mobile robot control apparatus 100 may be slightly different from a command actually intended by the user. At the current technology level, the EEG analysis result of the user does not exactly match the actual will of the user. In other words, even though the user thinks "moving to the right", the input device 200 may not generate a movement command as "moving to the right", but may include "moving to the right and moving to front". In other words, the movement command has noise, usually with 95% accuracy.

A waypoint map estimating unit 120 may generate an estimated waypoint map in which a waypoint vector is defined for each grid, based on the received movement command.

Figure 2A:
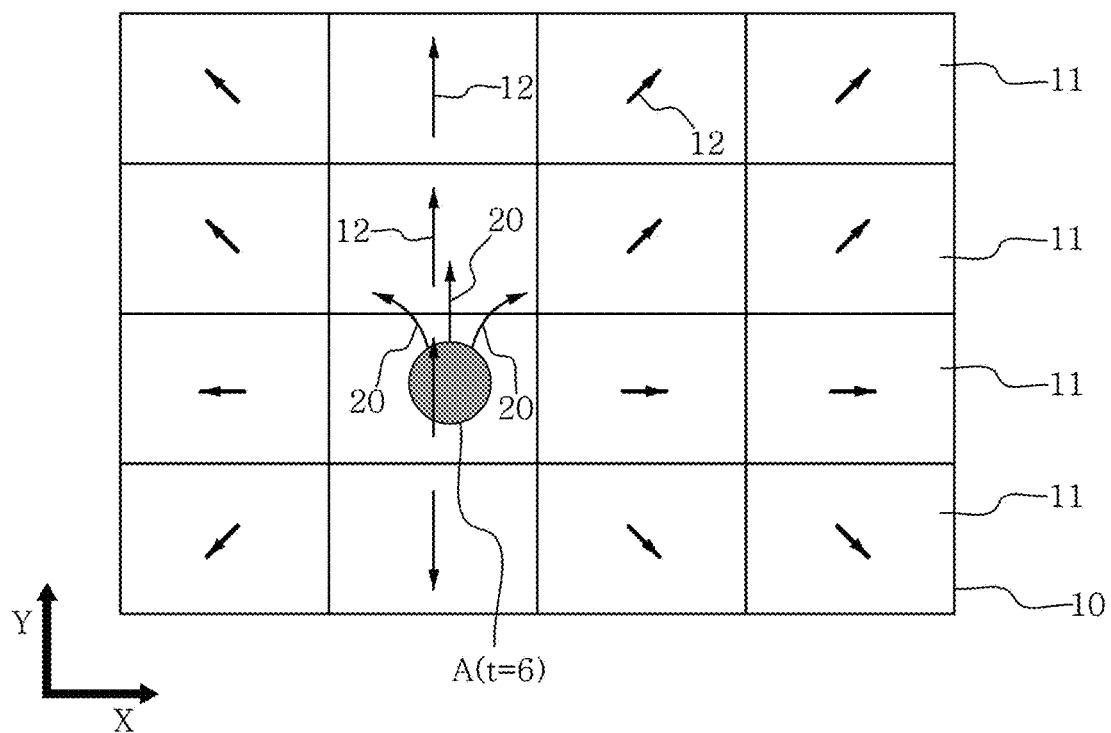
FIGS. 2A to 2C show examples showing the movement of a mobile robot on an estimated waypoint map according to an embodiment of the present disclosure.
Figure 2B:
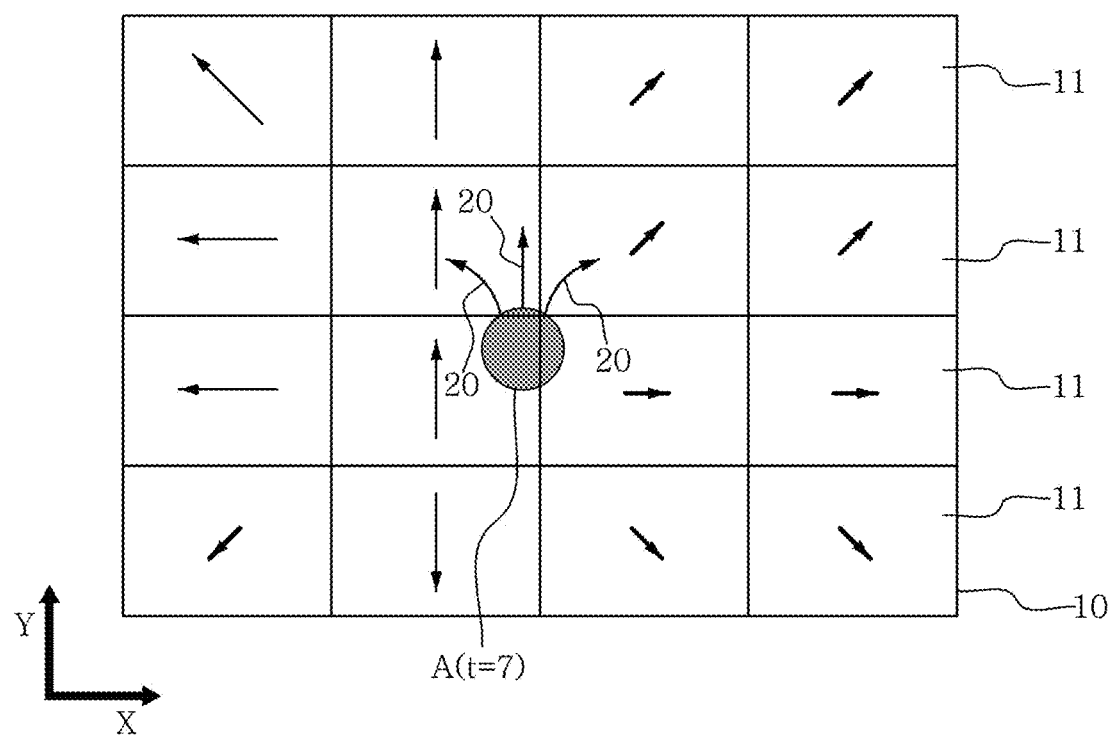
Figure 2C:
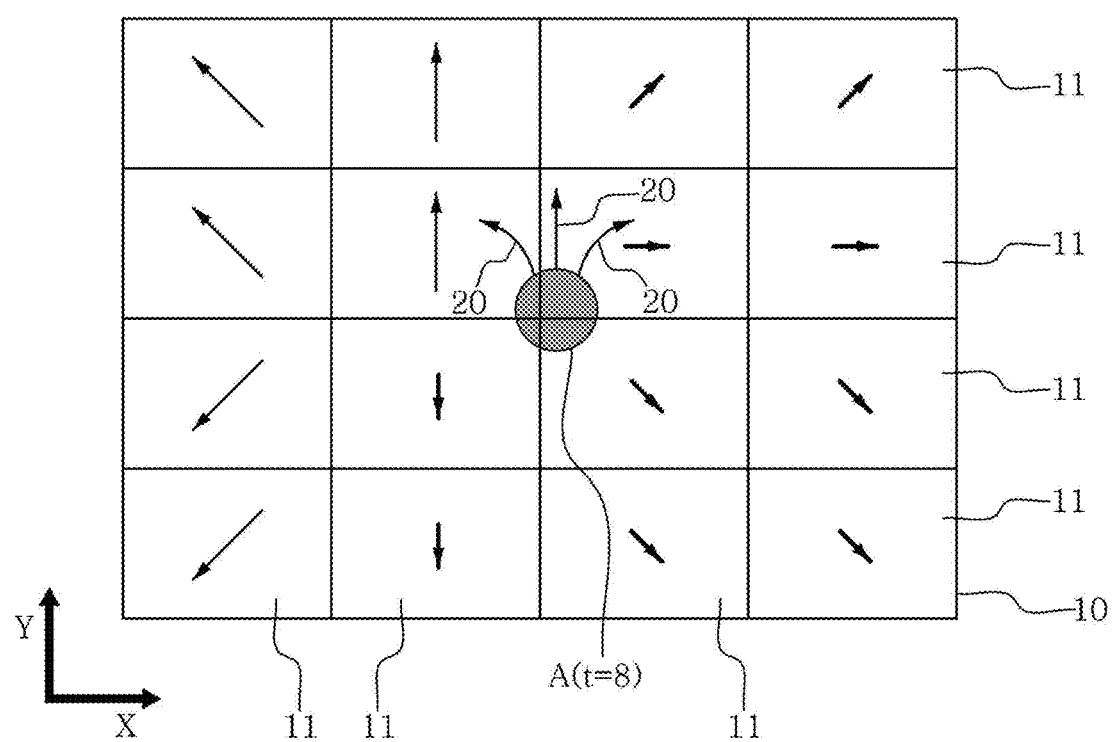

FIGS. 2A to 2C show examples showing the movement of a mobile robot on an estimated waypoint map according to an embodiment of the present disclosure. In FIGS. 2A to 2C, a position of each mobile robot A is shown with a delay time of 6 seconds. That is, in this specification, the delay time of the input device 200 is described as 6 seconds, but the present disclosure is not limited thereto. FIGS. 2A to 2C shows an example in which the user inputs a user EEG to the input device 200 so that the mobile robot A moves only in the Y-axis direction from t=0 to t=3 seconds.

Referring to FIGS. 2A to 2C, the estimated waypoint map 10 is composed of grids 11, and a waypoint vector 12 is defined for each grid 11.

In FIGS. 2A to 2C, the grids 11 classifies the area around the mobile robot A into a lattice form, and the waypoint vector 12 is a vector representing a movable speed (a direction and a speed) of the mobile robot in each grid. The waypoint vector 12 of each grid 11 may be determined according to the current position of the mobile robot and the movement command received from the input device 200 or may be arbitrarily determined by a developer. In FIG. 2A, the waypoint vectors 12 may be determined based on the movement command according to the user EEG that is input before a delay time (assuming 6 seconds here), for the current position (at t=6) of the mobile robot.

Referring to FIG. 2A, the waypoint vector 12 is displayed for each grid 11, and the direction and size of the arrow representing the waypoint vector 12 indicate the direction and size of the moving probability of the mobile robot A at t=6. The size and direction of the waypoint vector 12 at t=6 may be determined by the movement command according to the user EEG that is input to the input device 200 at t=0, or determined by the sum of the waypoint vectors determined according to user EEG inputs during a predetermined time before t=6.

As described above, the waypoint map estimating unit 120 may generate the estimated waypoint map including the waypoint vectors for the user input, and store the estimated waypoint map in a database DB 150. Even though FIGS. 2A to 2C depicts only t=6, 7 and 8, the waypoint map estimating unit 120 may generate a time-based estimated waypoint map at shorter time intervals.

In an embodiment, when a plurality of time-series user inputs are received, the waypoint map estimating unit 120 may add a waypoint vector for each grid of the estimated waypoint map according to each user input. In other words, a set of waypoint vectors of the estimated waypoint map may be determined as shown in Table 1 below.

TABLE 1

Algorithm 1 Waypoint Map Estimation

Input: $\overline{W}_{\tau \to t-1}$, $\dot{W}_{\tau^+ \to t\tau^+}$
Output: $\overline{W}_{\tau \to t}$
1:   for all i ∈ index do
2:       $\overline{W}_{\tau \to t}^{[i]}$ ← predict($\overline{W}_{\tau \to t-1}^{[i]}$) using (6)
3:   end for
4:   if $\dot{W}_{\tau^+ \to \tau^+}^{} \neq \emptyset$ then
5:       for all $\dot{W}_{\tau^+ \to \tau^+}^{[i]} \in \dot{W}_{\tau^+ \to \tau^+}$ do
6:           $W_{\tau^+ \to t}^{[i]}$ ← estimate($W_{\tau \to t}^{[i]}, \dot{W}_{\tau^+ \to \tau^+}^{[i]}$) using (7)
7:       end for
8:       τ ← τ⁺
9:   end if
10:  return $W_{\tau \to t}$ The above algorithm is a detailed estimating process of a waypoint map. A waypoint map $\overline{W}_{\tau \to t}$ at a current time point is estimated using a previous waypoint map $\overline{W}_{\tau \to t-1}$ and a user input model $\overline{W}_{\tau^+ \to \tau^+}$ input at a time point $\tau^+$. In detail, each step of Table 1 is as follows.

1 to 3: The waypoint vector is predicted for all grid of the map. Equation (6) used herein is [Equation 1] below. This will be described again later in relation to the equation.

4 to 9: A waypoint vector is estimated by using a checked user input. If there is no user input, this process is omitted. Equation (7) used for the estimation is $\overline{W}_{\tau^+ \to \tau+1}^{[i]}=\overline{W}_{\tau \to \tau+1}^{[i]}+\zeta^{\tau-\tau^++1}(2-\zeta)(\dot{W}_{\tau^+ \to \tau^+}^{[i]}-W_0)$, in which the assumption used in the predicting process is compensated by an observation result. Here, ζ is a damping ratio of a low-pass filter applied to the waypoint vector. In addition, the superscript [i] indicates that the corresponding element is the ith lattice of the waypoint map.

10: The predicted or estimated waypoint probability vector is returned.

In the algorithm, the unit of the time point is an operating cycle of the mobile robot and is denoted by a subscript. The time points used are as follows.

τ: recent time at which the user intends to command, which is already known by the mobile robot τ⁺: recent time at which the user intends to command, which is checked by the mobile robot t: current time $\overline{W}_{\tau^+ \to t\leftarrow 1}^{[i]}$: an estimated value of the waypoint vector placed at the ith lattice on the waypoint map at a time point t+1, estimated by applying the user input till the time point τ⁺, to which a low-pass filter is applied That is, the estimated waypoint maps for a predetermined time may be added to determine the estimated waypoint map. Here, the waypoint map estimating unit 120 may add a weight to the waypoint vector of the estimated waypoint map according to the time at which the movement command is received, when adding the waypoint vector for each grid of the estimated waypoint map according to each user input.

That is, as in Equation 1 below, the waypoint map estimating unit 120 may endow a larger weight as the time that the movement command is received is closer to the current time.

$$\overline{W}_{\tau \to t+1}^{[i]} = (1-\zeta)\overline{W}_0 + \zeta \overline{W}_{\tau \to t}^{[i]}$$  [Equation 1]

The above equation is a low-pass filter with a damping ratio ζ. This represents a predicting step in the waypoint vector estimating process. The waypoint probability vector at the time point t+1 is predicted based on the waypoint vector at the time point t. The calculation is performed in a state where the probability is in the form of log odds. Each element of the equation is as follows.

$\overline{W}_{\tau \to t+1}^{[i]}$: A predicted value of the waypoint vector placed at the ith grid on the waypoint map at the time point t+1, estimated by reflecting the user input till the time point τ, to which a low-pass filter is applied $W_0$: an initial value of the waypoint vector $\overline{W}_{\tau \to t}^{[i]}$: A predicted value of the waypoint vector placed at the ith grid on the waypoint map at the time point t, estimated by reflecting the user input till the time point τ, to which a low-pass filter is applied If the BCI is used as the input device, the mobile robot does not move exactly according to the intention of the user, and due to the delay time (assuming 6 seconds here) between the intention of the user and the actual movement, the difference between the intention of the user and the actual movement may become larger as time goes.

An area target determining unit 130 may calculate a movable path 20 to which the mobile robot A is movable from the current position, and determine a moving path of the mobile robot 20 based on the calculated movable path 20 and the waypoint vector 12 of the estimated waypoint map 10.

Here, the movable path may include a linear speed and an angular speed.

Referring to FIG. 2A, the movable path 20 may be determined based on the direction in which the mobile robot A faces and the current position. If the waypoint map 10 at t=6 is generated and the movable path 20 is determined as in FIG. 2A, the area target determining unit 130 may calculate an inner product of the calculated movable path and the waypoint vector of the waypoint map, and determine the moving path with a movable path in which the calculated inner product is greatest. That is, one of the movable paths 20 may be determined using a path that is most overlapped with the waypoint vectors 12 in the estimated waypoint map 10, and then selected as the moving path. Accordingly, the moving path of the mobile robot at t=6 seconds may be determined. This calculation may be performed repeatedly as the mobile robot moves.

Meanwhile, as described above, when the estimated waypoint map 10 is generated, the size and direction of the waypoint vectors 12 may be determined by summing or averaging the waypoint vectors 12 at the preceding time, and thus it may be understood that it is important to generate an estimated waypoint map composed of waypoint vectors that consider both the intention of the user and the current position of the mobile robot. To this end, the waypoint map estimating unit 120 may endow a larger weight as the time that the movement command is received is closer to the current time.

As described above, the moving path of the mobile robot may be determined by generating the estimated waypoint map and comparing the waypoint vectors of the generated estimated waypoint map with the movable path.

A driving unit 140 may move the mobile robot to the moving path determined as above. More specifically, the driving unit 140 may control an angular speed or a linear speed of the mobile robot.

Figure 3:
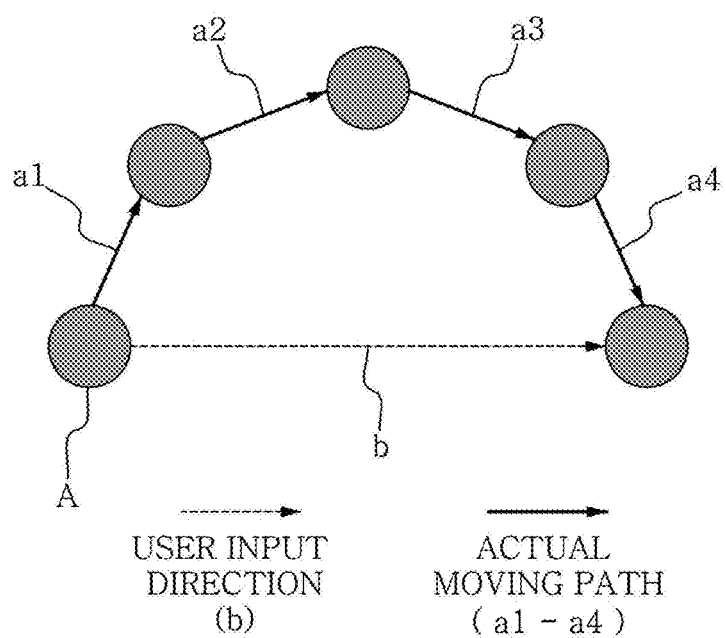
FIG. 3 shows a movement result of the mobile robot A according to an embodiment of the present disclosure.

FIG. 3 shows a movement result of the mobile robot A according to an embodiment of the present disclosure. Referring to FIG. 3, it may be found that the mobile robot A initially moves with a certain angle difference from the direction of a moving direction b according to the EEG input of the user, but progressively converges to the moving direction b according to the original EEG input of the user.

Figure 4:
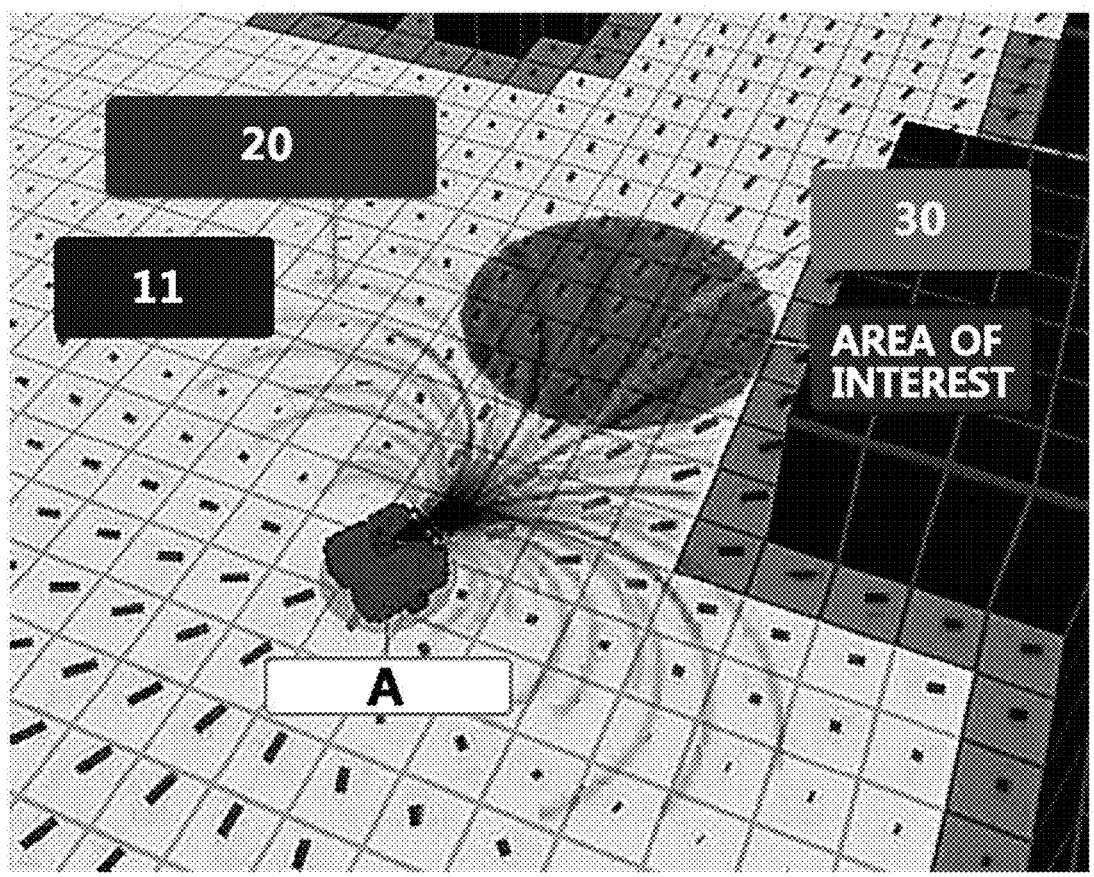
FIG. 4 is a diagram showing factors for the mobile robot A to determine a moving path on the estimated waypoint map according to an embodiment of the present disclosure.

FIG. 4 is a diagram showing factors for the mobile robot A to determine a moving path on the estimated waypoint map according to an embodiment of the present disclosure. Referring to FIG. 4, the waypoint vectors 12 of the estimated waypoint map, which are generated based on the estimated waypoint map for a specific time or a specific time interval, and the movable path 20 to which the mobile robot A is movable from the current position are depicted. Also, a moving path 30 determined by the inner product of the waypoint vectors 12 and the movable path 20 is depicted. The moving path 30 may be one of the movable paths 20, which has the greatest inner product with the waypoint vectors 12. In FIG. 4, the area of interest represents an area where the movable paths 20 of the mobile robot A are densely depicted over a predetermined density.

Figure 5:
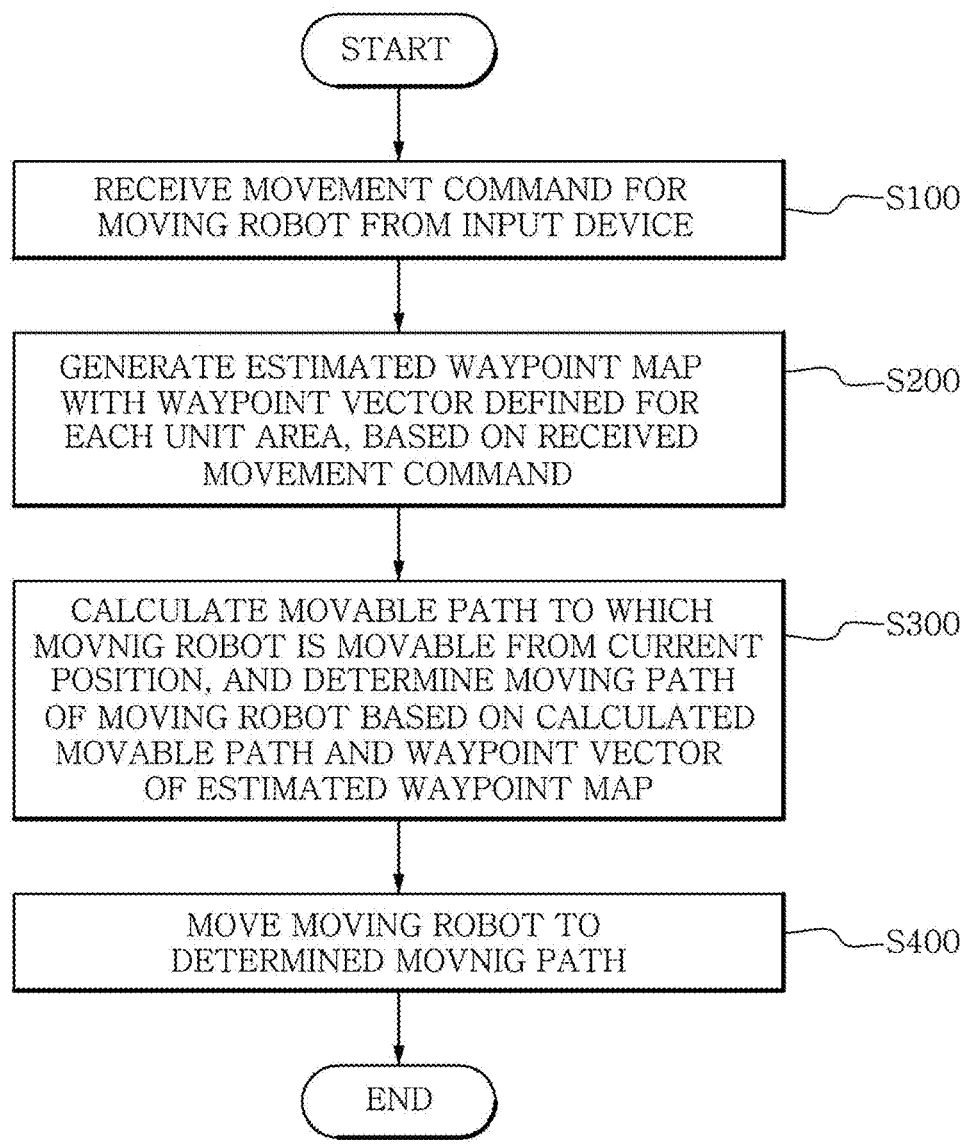
FIG. 5 is a flowchart for illustrating a mobile robot control method for compensating an input delay time according to an embodiment of the present disclosure.

FIG. 5 is a flowchart for illustrating a mobile robot control method for compensating an input delay time according to an embodiment of the present disclosure. The mobile robot control method for compensating an input delay time may be implemented by the components of the mobile robot control apparatus for compensating an input delay time as described above.

Referring to FIG. 5, the mobile robot control method for compensating an input delay time includes receiving a movement command for moving a mobile robot from an input device (S100), generating an estimated waypoint map in which a waypoint vector is defined for each grid, based on the received movement command (S200), calculating a movable path to which the mobile robot is movable from a current position and determining a moving path of the mobile robot based on the calculated movable path and the waypoint vector of the estimated waypoint map (S300), and moving the mobile robot to the moving path (S400).

Here, the movement command may be generated after a predetermined delay time after the user EEG is input to the input device from the user, and the input device may be a brain-computer interface (BCI).

In addition, the generating the estimated waypoint map may include, when a plurality of time-series user inputs are received, generating the waypoint map by adding a waypoint vector of each grid of the estimated waypoint map according to each user input. Here, when a waypoint vector of each grid of the estimated waypoint map according to each user input is added, a weight may be endowed to the waypoint vector of the estimated waypoint map according to the time that the movement command is received.

In addition, in the determining the moving path, an inner product of the calculated movable path and the waypoint vector of the waypoint map may be calculated, and a movable path at which the calculated inner product is greatest may be determined as a moving path.

A computer-readable recording medium according to an embodiment of the present disclosure may store commands for executing the mobile robot control method for compensating an input delay time as described above.

The mobile robot control apparatus for compensating an input delay time according to the present disclosure may control a mobile robot to compensate an input delay time by 1) checking a current position of the mobile robot, 2) generating an estimated waypoint map composed of waypoint vectors based on the movement command according to the user EEG that is input to the input device 200 before a delay time, 3) determining a movable path based on the current position and direction of the mobile robot, and 4) determining a moving path by using an inner product of the movable path and the waypoint vectors.

Although the present disclosure has been described with reference to the embodiments shown in the drawings, it should be understood that it is just for illustration and various changes and modifications can be made therefrom without departing from the scope of the present disclosure by those skilled in the art. However, such modifications should be considered to be within the scope of the present disclosure. Thus, the true scope of the present disclosure should be defined by the appended claims.

What is claimed is:

1. A mobile robot control apparatus for compensating an input delay time, comprising at least one processor configured to implement:

a user input receiving unit configured to receive a user input including a movement command for moving a mobile robot from an input device;

a waypoint map estimating unit configured to generate an estimated waypoint map in which a waypoint vector is defined for each of grids of the estimated waypoint map, based on the received user input;

an area target determining unit configured to calculate a movable path to which the mobile robot is movable from a current position, and to determine a moving path of the mobile robot based on the calculated movable path and the waypoint vector of the estimated waypoint map; and a driving unit configured to move the mobile robot to the determined moving path;

wherein when a plurality of time-series user inputs are received, the waypoint map estimating unit adds a waypoint vector of each grid of the estimated waypoint map according to each user input;

wherein when adding the waypoint vector of each grid of the estimated waypoint map according to each user input, the waypoint map estimating unit endows a weight to the waypoint vector of the estimated waypoint map according to a time that the movement command is received;

wherein the waypoint map estimating unit is configured to, in endowing the weight to the waypoint vector, apply a low-pass filter with a predetermined damping ratio; and wherein the low-pass filter has the form:

$$\overline{W}_{\tau \to t+1}^{[i]} = (1-\zeta)W_0 + \zeta \overline{W}_{\tau \to t}^{[i]},$$

where $\overline{W}_{\tau \to t+1}^{[i]}$ is a predicted value of a waypoint vector placed at an ith grid on the waypoint map at a time point t+1, estimated by reflecting the user inputs till a time point τ, to which the low-pass filter is applied, $W_0$ is an initial value of the waypoint vector placed at the ith grid, $\overline{W}_{\tau \to t}^{[i]}$ is a predicted value of the waypoint vector placed at the ith grid on the waypoint map at a time point t, estimated by reflecting the user inputs till the time point τ, to which the low-pass filter is applied, and ζ is the predetermined damping ratio.

2. The mobile robot control apparatus for compensating an input delay time according to claim 1,
wherein the user input receiving unit receives the movement command after a predetermined delay time after a user electroencephalography (EEG) is input to the input device from a user.

3. The mobile robot control apparatus for compensating an input delay time according to claim 2,
wherein the input device is a brain-computer interface (BCI).

4. The mobile robot control apparatus for compensating an input delay time according to claim 1,
wherein the waypoint map estimating unit endows a greater weight as the time that the movement command is received is closer to a current time.

5. The mobile robot control apparatus for compensating an input delay time according to claim 1,
wherein the movable path includes a linear speed and an angular speed.

6. The mobile robot control apparatus for compensating an input delay time according to claim 1,
wherein the area target determining unit calculates an inner product of the calculated movable path and the waypoint vector of the waypoint map, and determines a movable path at which the calculated inner product is greatest as a moving path.

7. A mobile robot control method for compensating an input delay time, comprising:
receiving a movement command for moving a mobile robot from an input device;
generating an estimated waypoint map in which a waypoint vector is defined for each of grids of the estimated waypoint map, based on the received movement command;
calculating a movable path to which the mobile robot is movable from a current position, and determining a moving path of the mobile robot based on the calculated movable path and the waypoint vector of the estimated waypoint map; and
moving the mobile robot to the determined moving path;
wherein the generating the estimated waypoint map includes:
when a plurality of time-series user inputs are received, generating the waypoint map by adding a waypoint vector of each grid of the estimated waypoint map according to each user input,
wherein when the waypoint vector of each grid of the estimated waypoint map according to each user input is added, a weight is endowed to the waypoint vector of the estimated waypoint map according to a time that the movement command is received, and in endowing the weight to the waypoint vector, a low-pass filter with a predetermined damping ratio is applied; and
wherein the low-pass filter has the form:

$$\overline{W}_{\tau \to t+1}^{[i]} = (1-\zeta)W_0 + \zeta \overline{W}_{\tau \to t}^{[i]},$$

where $\overline{W}_{\tau \to t+1}^{[i]}$ is a predicted value of a waypoint vector placed at an ith grid on the waypoint map at a time point t+1, estimated by reflecting the user inputs till a time point τ, to which the low-pass filter is applied, $W_0$ is an initial value of the waypoint vector placed at the ith grid, $\overline{W}_{\tau \to t}^{[i]}$ is a predicted value of the waypoint vector placed at the ith grid on the waypoint map at a time point t, estimated by reflecting the user inputs till the time point τ, to which the low-pass filter is applied, and ζ is the predetermined damping ratio.

8. The mobile robot control method for compensating an input delay time according to claim 7,
wherein the movement command is generated after a predetermined delay time after a user electroencephalography (EEG) is input to the input device from a user, and the input device is a brain-computer interface (BCI).

9. The mobile robot control method for compensating an input delay time according to claim 7,
wherein the determining the moving path includes:
calculating an inner product of the calculated movable path and the waypoint vector of the waypoint map, and determining a movable path at which the calculated inner product is greatest as a moving path.

10. A non-transitory computer-readable recording medium, in which commands for executing a mobile robot control method for compensating an input delay time according to claim 7 are stored.

* * * * *